United States Patent
Khatib et al.

(10) Patent No.: US 11,038,352 B1
(45) Date of Patent: Jun. 15, 2021

(54) CONTROL SYSTEM WITH LOAD SELECTION STRATEGY THAT MINIMIZES LOAD OVERSHED

(71) Applicant: Schweitzer Engineering Laboratories, Inc., Pullman, WA (US)

(72) Inventors: Abdel Rahman Khatib, Pullman, WA (US); Niannian Cai, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 99 days.

(21) Appl. No.: 16/695,978

(22) Filed: Nov. 26, 2019

(51) Int. Cl.
*H02J 3/14* (2006.01)
*H02J 3/00* (2006.01)
*H02J 3/06* (2006.01)
*G05B 19/042* (2006.01)
*G05F 1/66* (2006.01)
*G05B 13/02* (2006.01)
*H02J 13/00* (2006.01)

(52) U.S. Cl.
CPC ............... *H02J 3/14* (2013.01); *G05B 13/02* (2013.01); *G05B 19/0421* (2013.01); *G05F 1/66* (2013.01); *H02J 3/008* (2013.01); *H02J 3/06* (2013.01); *H02J 13/0006* (2013.01)

(58) Field of Classification Search
CPC ...... H02J 3/14; H02J 3/06; H02J 3/008; H02J 13/0006; G05B 13/02; G05B 19/0421; G05F 1/66
See application file for complete search history.

(56) References Cited

U.S. PATENT DOCUMENTS

| | | | |
|---|---|---|---|
| 7,356,422 B2 | 4/2008 | Schweitzer, III | |
| 8,744,638 B2 | 6/2014 | Tyagi | |
| 9,519,301 B2 | 12/2016 | Bartlett | |
| 2017/0229870 A1* | 8/2017 | Singh | H02J 3/383 |
| 2018/0191160 A1* | 7/2018 | Carr | H02J 3/14 |
| 2018/0232818 A1* | 8/2018 | Eda | G06N 5/022 |
| 2020/0083714 A1* | 3/2020 | Asawa | H02J 3/382 |

* cited by examiner

*Primary Examiner* — Ziaul Karim
(74) *Attorney, Agent, or Firm* — Bradley W. Schield (57) ABSTRACT

Systems and methods described herein may be used to search for a minimum load overshed in a power system. For example, a control system includes memory and a processor operatively coupled to the memory. The processor may obtain an amount of power consumed by each load in a total set of loads in a microgrid. The processor may detect a difference between the amount of power generated and the amount of power consumed. The processor may select a subset of loads to shed from the total set of loads by searching a tree of potential load shed amounts to substantially balance the amount of power generated with the amount of power consumed. The processor may send one or more signals to one or more electronic devices to cause the selected subset of loads to be shed.

20 Claims, 4 Drawing Sheets

CONTROL SYSTEM WITH LOAD SELECTION STRATEGY THAT MINIMIZES LOAD OVERSHED

TECHNICAL FIELD

The present disclosure relates generally to load shedding and, more particularly, to a control system that minimizes load overshed.

BRIEF DESCRIPTION OF THE DRAWINGS

Non-limiting and non-exhaustive embodiments of the disclosure are described herein, including various embodiments of the disclosure with reference to the figures listed below.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Power systems include equipment, such as generators, power lines, transformers, and the like, to provide electrical energy from a source to one or more loads. Control systems may be used to monitor the power being delivered and to make control decisions regarding such power systems. For example, control systems may take one or more control actions upon occurrence of a contingency in the electric power system. A contingency may refer to loss and/or failure of equipment on the power system, an overcurrent, undercurrent, overvoltage, or undervoltage on the power system, or the like. These contingencies may be caused by faults, generator failure, transformer failure, or any other event on the power delivery system. In some cases, the contingency may impact the power being generated and/or the power being demanded. Control systems may perform control action(s), such as shedding loads, to balance power generation with power demand upon occurrence of the contingency to maintain operation of the electric power system.

In industrial applications, load shedding priorities may be determined by priorities of the industrial process. For example, in a system that has a low priority process with a load at 16 MW that depends upon a high priority process with a load at 4 MW, if the system loses 3 MW of generation, the system follows the priorities and sheds the 16 W process instead of selecting the 4 MW process due to the load priorities. In such systems, there may not be consideration for the extent to which the load shed exceeds the amount lost from generation due to these dependencies. However, in other processes, such as in university or residential microgrids, the loads of different buildings may not have strict priorities and/or may not depend upon each other. In such systems, it may be desired to minimize the load overshed to reduce the number of loads affected by losses in generation.

As explained below, a control system may evaluate potential combinations of loads to shed and select the combination that substantially reduces or minimizes the amount of load overshed (e.g., within a deadband). Load overshed may refer to the amount of power generation that exceeds the amount of power of the loads following shedding of loads. In the example above, upon a 3 MW loss of generation, by shedding the 16 MW load, the power system may have a load overshed of 13 MW. Further, as the number of selectable loads that can be shed increases, the combinations of loads that may be shed to balance the power generation with the power demand increases exponentially. As explained below, the control system may select the minimum load overshed while satisfying the allowed controller response time frame (e.g., 1 ms, 2 ms, 4 ms, 5 ms, etc.).

Figure 1:
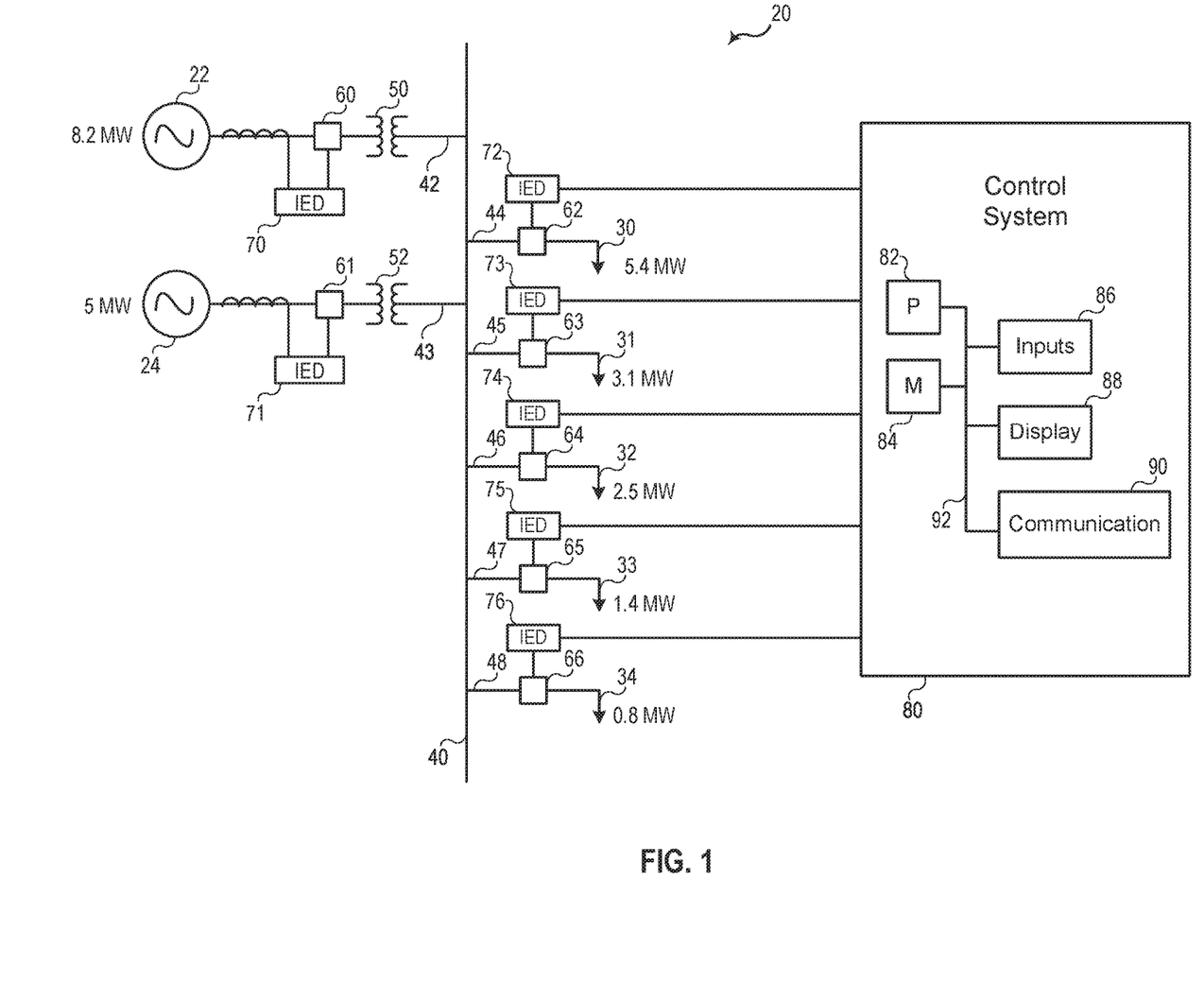
FIG. 1 is a one line diagram of a power system that is controlled by a control system, in accordance with an embodiment.

FIG. 1 illustrates a simplified one-line diagram of an alternating current electric power transmission and distribution system 20, according to one embodiment. The power system 20 may generate, transmit, and distribute electric power to loads 30-34. Electric power systems may include equipment, such as power sources 22 and 24 (e.g., electric generators), power transformers 50 and 52, power lines 42-48, circuit breakers 60-66, busses 40, loads 30-34, and the like. A variety of other types of equipment may also be included in the power system 20, such as voltage regulators, capacitor banks, and a variety of other types of equipment known to those of skill in the art.

In the illustrated embodiment, the power sources 22 and 24 generate and provide electrical energy to loads 30-34 via a bus 40. The bus 40 may be communicatively connected to power lines 42-48 between the power sources 22 and 24 and the loads 30-34 to allow electrical energy to flow to the loads 30-34. The power sources 22 and 24 may be connected to the bus 40 via transformers 50 and 52.

The electric power system 20 may be monitored, controlled, automated, and/or protected using IEDs 70-76 and a control system 80. In general, IEDs in a power system may be used for protection, control, automation, and/or monitoring of equipment in the system (referred to generally in some instances as "monitoring" that may further include various protection, control, and/or automation actions). For example, IEDs may be used to monitor equipment of many types, including electric transmission lines, electric distribution lines, current transformers, busses, switches, circuit breakers, reclosers, transformers, autotransformers, tap changers, voltage regulators, capacitor banks, generators, motors, pumps, compressors, valves, and a variety of other types of monitored equipment. The IEDs may use the monitored information to perform or facilitate the performance of various protection, control, and/or automation schemas.

As used herein, an IED (such as IEDs 70-76) may refer to any microprocessor-based device that monitors, controls, automates, and/or protects monitored equipment within the system 20. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system comprising multiple IEDs.

In various embodiments, the IEDs 70-76 may monitor electrical power characteristics (e.g., frequency, voltage, current, etc.) of alternating current waveforms in the power system 20. The IEDs 70-76 may obtain current measurements and voltage measurements of the power lines via voltage and current sensors. The IEDs 70-76 may communicate the current and voltage measurements to the control system 80 to allow the control system 80 to perform the processes described herein.

According to various embodiments, the control system 80 may comprise one or more of a variety of types of systems. For example, the control system 80 may include a supervisory control and data acquisition (SCADA) system and/or a wide area control and situational awareness (WACSA) system. These other IEDs 70-76 may be remote from the control system 80, and may communicate over various media, such as a direct communication, over a wide-area communications network, or through other IEDs therebetween.

Using the current and voltage measurements of the IEDs 70-76, the control system 80 may obtain an amount of power generated by each power source 22 and 24 and an amount of power consumed by each load 30-34 in the set of loads. To reliably provide power, the control system 80 may balance the power generated with the power demanded. In the illustrated embodiment, 13.2 Megawatts (MW) of power are being generated by power sources 22 and 24, and 13.2 MW of power are being consumed by loads 30-34. If an event occurs in which power generation is lost, loads may be shed to maintain the balance between power generated and power demanded. As an example, used in FIGS. 2 and 3 below, a contingency occurs in which the power source 24 is disconnected from the electric power system 20 via opening of the circuit breaker 61, thereby causing a loss of 5 MW generation. The control system 80 may detect a difference between the amount of power generated and the amount of power consumed.

As mentioned above, some control systems may shed load according to priority. However, shedding loads according to priority may not result in minimizing load overshedding. In microgrids of, for example, residential or university buildings/facilities, loads may not have dependencies and may have similar priority such that it is more desirable to reduce or minimize overshedding of loads. In the illustrated example with five loads, there may be $2^5$, or 32, total load combinations. Further, each additional load may cause an exponential increase in total load combinations. Upon occurrence of a contingency, there may be limited time in making control decisions to balance power generation with the power demand.

The control system 80 may select the optimal loads to shed that achieve the minimum load overshed within a dead band. Otherwise, the control system 80 may find a load shed combination that achieves the minimum load overshed. In the described example where 5 MW of generation is lost, if the control system 80 can determine a load combination to shed that is less than 5.3 MW (e.g., the minimum load overshed within a 0.3 MW deadband) and greater than 5 MW, then the control system 80 can output such a solution. Otherwise, the control system 80 may find the load combination that has the least load overshed greater than 5 MW (e.g., that exceeds the deadband).

The control system 80 includes a processor 82, a computer-readable storage medium 84, input structures 86, a display 88, and communication circuitry 90. The control system 80 may include one or more bus(es) 92 connecting the processor 82 or processing unit(s) to the computer-readable storage medium 84, the input structures 86, the display 88, and/or the communication circuitry 90. The computer-readable storage medium 84 may be embodied as memory, such as random access memory (RAM), read only memory (ROM), or a combination thereof, and may include or interface with software, hardware, or firmware modules for implementing various portions of the systems and methods described herein. The computer-readable storage medium 84 may be the repository of one or more modules and/or executable instructions configured to implement any of the processes described herein.

The processor 82 may process inputs received via the input structures 86 and the communication circuitry 90. The processor 82 may operate using any number of processing rates and architectures. The processor 82 may be configured to perform various algorithms and calculations described herein using computer executable instructions stored on computer-readable storage medium 84. The processor 82 may be embodied as a microprocessor. In certain embodiments, the processor 82 and/or the computer-readable storage medium 84 may be embodied as discrete electrical components, a general purpose integrated circuit, one or more Application Specific Integrated Circuits ("ASICs"), a Field Programmable Gate Array ("FPGA"), and/or other programmable logic devices. The processor 82 and/or the computer-readable storage medium 84 may be referred to generally as processing circuitry.

The communication circuitry 90 may include communication ports, such as ethernet and serial ports. In some embodiments, control system 80 may send using by communicating using the ethernet or serial ports. The control system 80 may include a display screen 88 that displays information to notify an operator of operating parameters of the power system 20, such as power generation, power consumption, circuit breaker status, etc. The input structures 86 may include buttons, controls, universal serial bus (USB) ports, or the like, to allow a user to provide input settings to the control system 80. For example, the topology of the power system 20 may be inserted into the control system 80 via the input structures 86. In some embodiments, the display 88 may be a touchscreen display.

Each of the IEDs 70-76 may provide electrical measurements, such as current measurements, voltage measurements, power measurements, or the like, to the control system 80. Upon detection of a contingency, the control system 80 may select which loads to shed that result in a minimum load overshed. The control system 80 may then send one or more signal(s) to the IEDs 70-76 to cause the selected loads to be shed.

Figure 2:
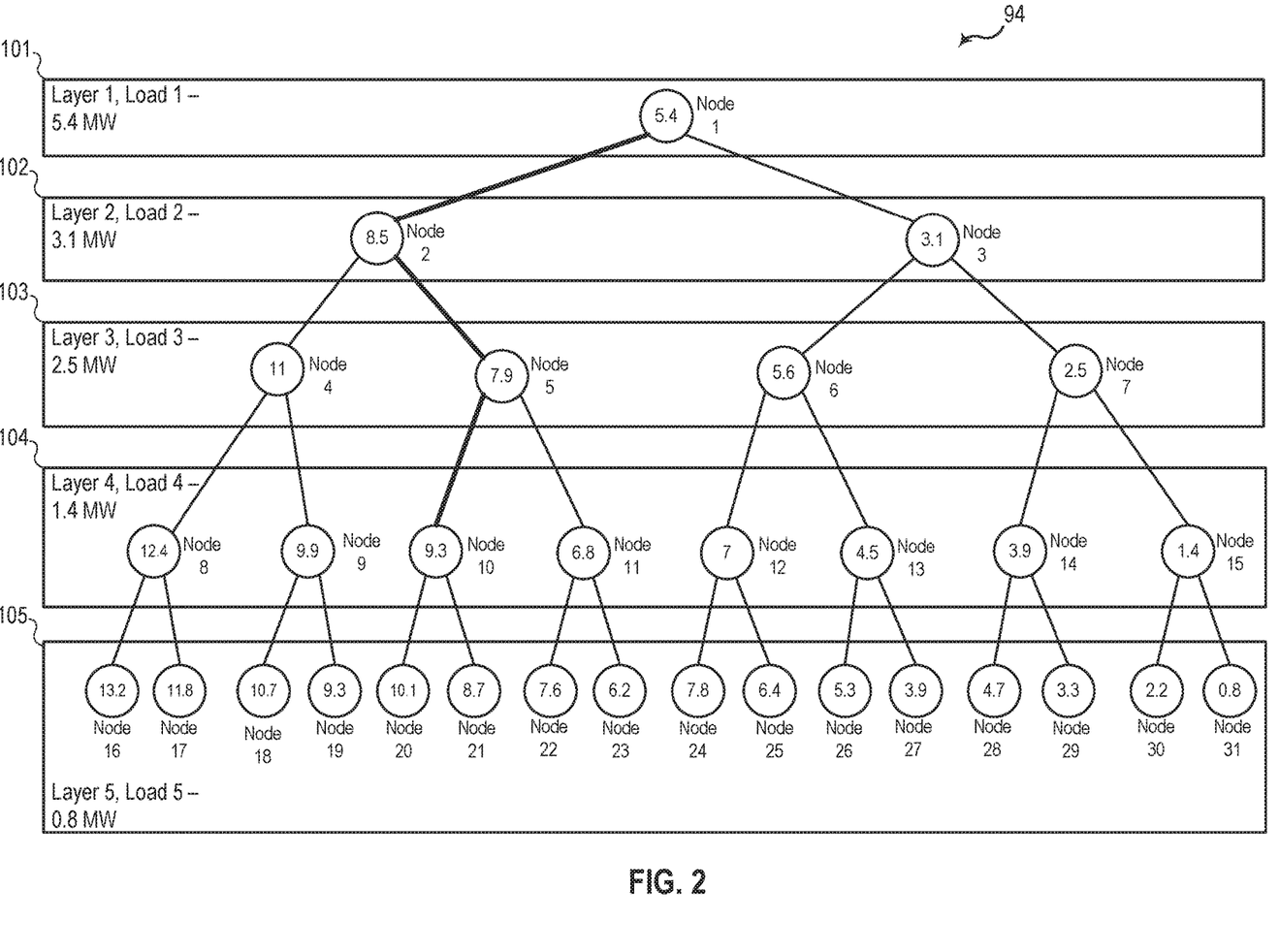
FIG. 2 is a diagram of a tree of combinations of loads in the power system that are controlled by the control system of FIG. 1, in accordance with an embodiment.

As explained below, the selectable loads to shed of the power system 20 may be modeled using a tree. FIG. 2 is an example of a binary tree 94 data structure that represents the potential combinations of load shedding that the control system 80 may select. Each layer 101-105 may represent one of the loads 30-34. For example, the first layer 101 represents the 5.4 MW load 30, the second layer 102 represents the 3.1 MW load 31, the third layer 103 represents the 2.5 MW load, the fourth layer 104 represents the 1.4 MW load, and the fifth layer 105 represents the 0.8 MW 34. Each node 1-31 of the tree 94 has a value attribute representing the amount of load to shed determined by the shortest route from root node to this node. The number of times that a route passes a layer is no more than one. If a route passes to the left node in the layer, it means the corresponding load is selected to be shed. If a route passes to the right of the node in the layer, it means the corresponding load is not selected. The node in the last layer of the route is selected to be shed. The load in layers that have not been passed by the route are not selected to shed. Therefore, the attribute value of each node presents a load selected to shed determined by the rout from the root node to that node. For example, the route to node 10 is emphasized in FIG. 2. It passes layer 1 to the left, layer 2 to the right, layer 3 to the left; therefore, load 1 and load 3 are selected to shed. Layer 4 is the last layer in the route, therefore load 4 is also selected to shed. The route has not passed layer 5, therefore load 5 is not selected to shed. Hence, total load selected to shed for node 10 is load1+load2+load4=9.3 MW.

In the illustrated embodiment, there is a total of 31 nodes in the tree 94. Each node represents a combination of loads selected to shed. For a five-load system, the total number of load combinations is $2^5$, or 32. The missing load in the tree 94 is the zero load to shed. Table 1 lists each node, the associated combination of loads to shed if the node is selected, and the total amount of power shed if the node is selected.

TABLE 1

Nodes that represent each potential combination of loads to shed

| Node # | Load to Shed Combination | Amount to Shed (MW) |
| --- | --- | --- |
| Node 1 | Load 1 | 5.4 |
| Node 2 | Load 1 + Load 2 | 8.5 |
| Node 3 | Load 2 | 3.1 |
| Node 4 | Load 1 + Load 2 + Load 3 | 11 |
| Node 5 | Load 1 + Load 3 | 7.9 |
| Node 6 | Load 2 + Load 3 | 5.6 |
| Node 7 | Load 3 | 2.5 |
| Node 8 | Load 1 + Load 2 + Load 3 + Load 4 | 12.4 |
| Node 9 | Load 1 + Load 2 + Load 4 | 9.9 |
| Node 10 | Load 1 + Load 3 + Load 4 | 9.3 |
| Node 11 | Load 1 + Load 4 | 6.8 |
| Node 12 | Load 2 + Load 3 + Load 4 | 7 |
| Node 13 | Load 2 + Load 4 | 4.5 |
| Node 14 | Load 3 + Load 4 | 3.9 |
| Node 15 | Load 4 | 1.4 |
| Node 16 | Load 1 + Load 2 + Load 3 + Load 4 + Load 5 | 13.2 |
| Node 17 | Load 1 + Load 2 + Load 3 + Load 5 | 11.8 |
| Node 18 | Load 1 + Load 2 + Load 4 + Load 5 | 10.7 |
| Node 19 | Load 1 + Load 2 + Load 5 | 9.3 |
| Node 20 | Load 1 + Load 3 + Load 4 + Load 5 | 10.1 |
| Node 21 | Load 1 + Load 3 + Load 5 | 8.7 |
| Node 22 | Load 1 + Load 4 + Load 5 | 7.6 |
| Node 23 | Load 1 + Load 5 | 6.2 |
| Node 24 | Load 2 + Load 3 + Load 4 + Load 5 | 7.8 |
| Node 25 | Load 2 + Load 3 + Load 5 | 6.4 |
| Node 26 | Load 2 + Load 4 + Load 5 | 5.3 |
| Node 27 | Load 2 + Load 5 | 3.9 |
| Node 28 | Load 3 + Load 4 + Load 5 | 4.7 |
| Node 29 | Load 3 + Load 5 | 3.3 |
| Node 30 | Load 4 + Load 5 | 2.2 |
| Node 31 | Load 5 | 0.8 |

In the examples herein, the root node refers to the topmost node in the tree 94. For example, node 1 is the root node of the tree 94 of FIG. 2. A parent node of node X is the node that locates in the upper layer of the tree which is linked to node X. For instance, node 1 is a parent node of node 2, and node 5 is a parent node of node 11. A node may have two child nodes in the lower layer of the tree to which the node X is linked. The node on the left is referred to as the left child node and the node on the right is referred to as the right child node. For example, node 12 and node 13 are child nodes of node 6. Node 12 is referred to as the left child node and node 13 is referred to as the right child node. The nodes in the tree 94 that do not have child nodes are called leaf nodes. A subtree is a subcollection of nodes that form a tree. Each node X (except the leaf node) has two subtrees. In this example, the tree 94 is such that for any node, the values in the left subtree of the node are greater than the node value. For any subtree, the largest value is located in the left-most leaf.

Figure 3:
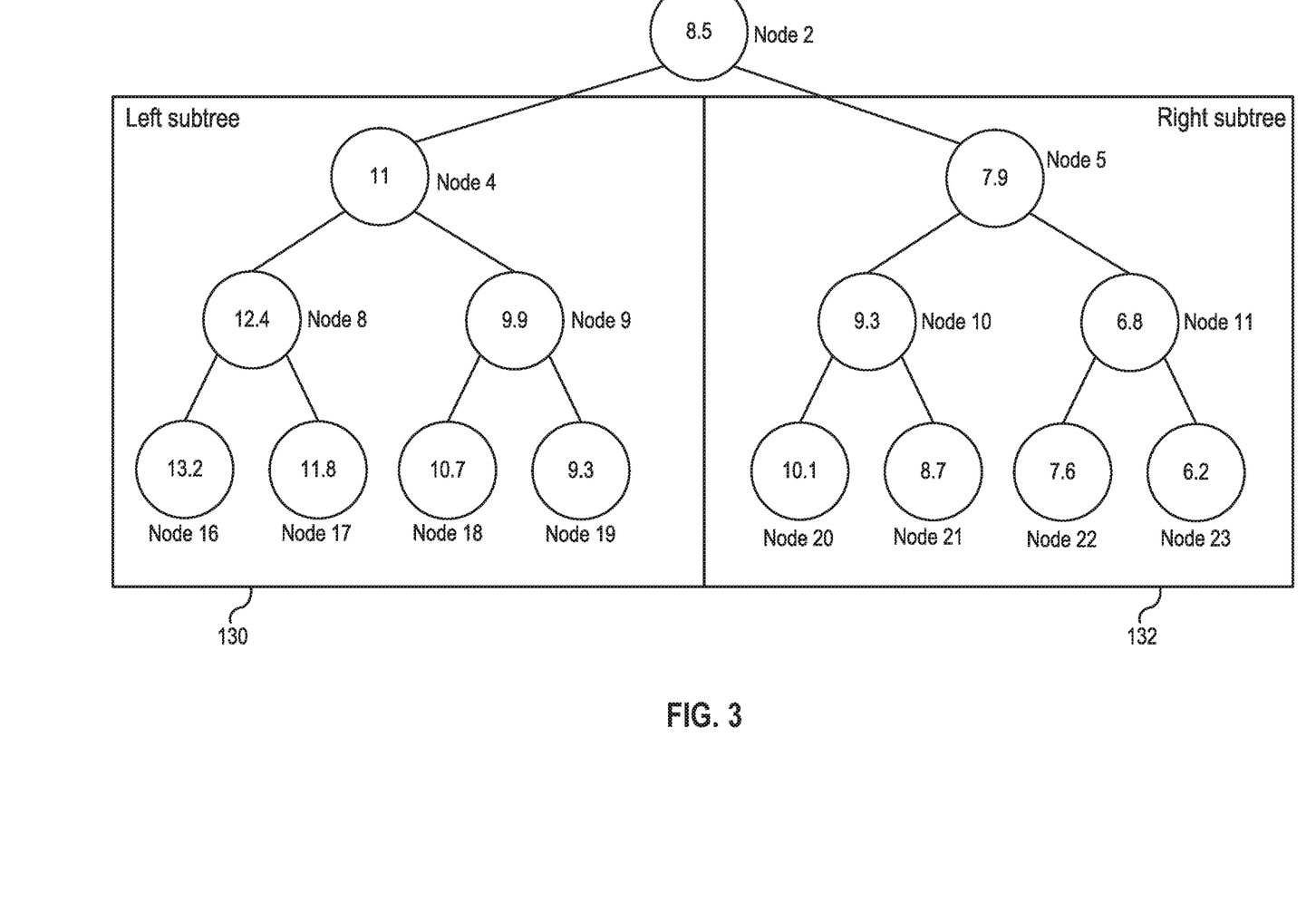
FIG. 3 is a diagram of a subtree of the tree of FIG. 2, in accordance with an embodiment.

FIG. 3 illustrates two subtrees of node 2 of FIG. 2. The subtree on the left is referred to as the left subtree 130 and includes nodes 4, 8, 9, 16, 17, 18, and 19. The subtree on the right is referred to as the right subtree 132 and includes nodes 5, 10, 11, 20, 21, 22, and 23. Node 2, the left subtree, and the right subtree, are referred to as a left subtree of node 1.

Figure 4:
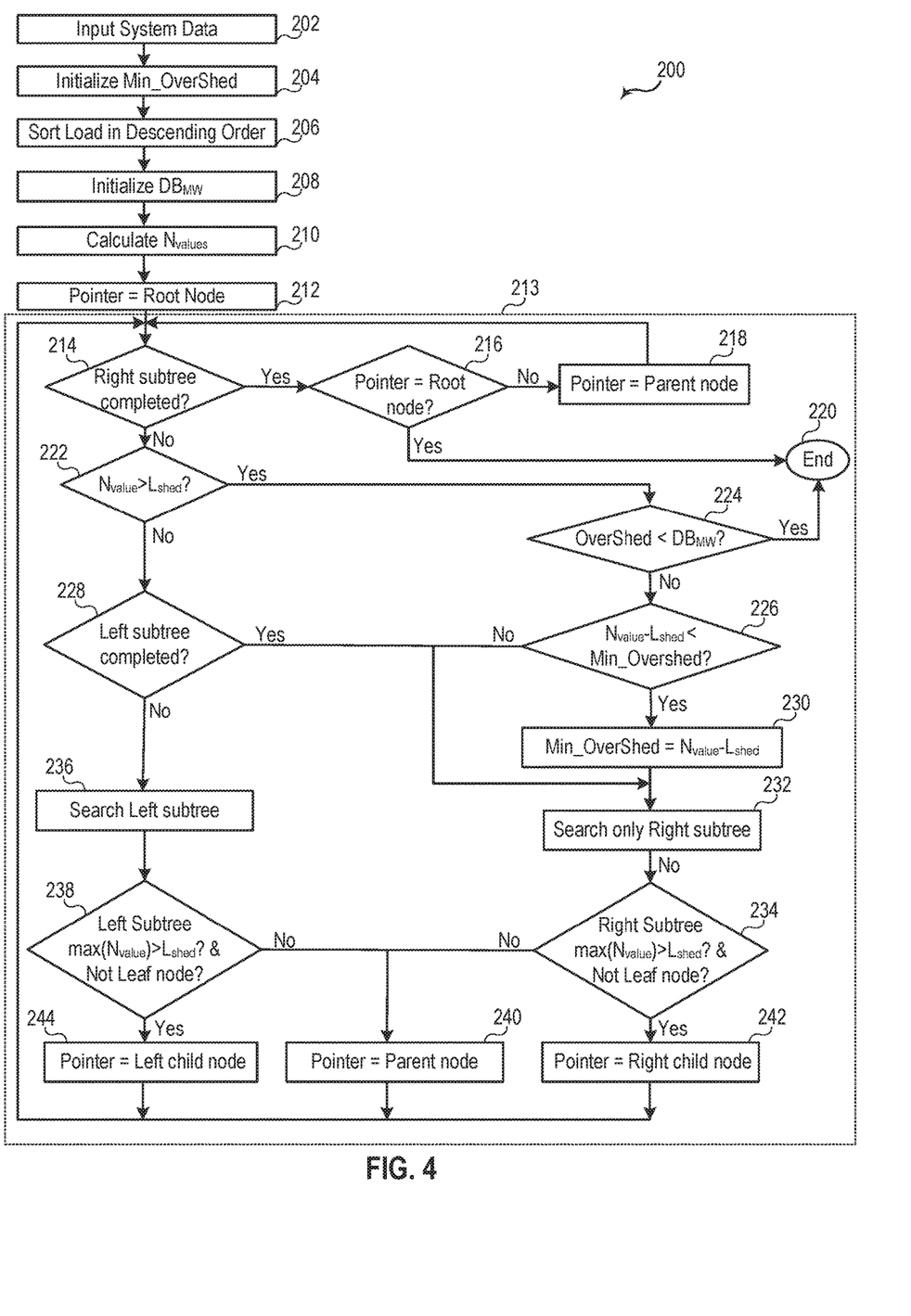
FIG. 4 is flow diagram of a process that may be performed by the control system of FIG. 1 to search the tree for a combination of loads that minimizes load overshed, in accordance with an embodiment.

FIG. 4 is a process that may be performed to obtain the node in FIG. 2 that is the minimum overshed within a deadband. The control system 80 may obtain system data that includes the power usage of each load and total power of loads required to be shed $L_{shed}$ (block 202). The control system 80 may initialize the minimum overshed min_overshed to be a large value (e.g., the left-most leaf value) to record minimum amount of load overshed found during the search (block 204). The control system 80 may sort the loads according to the associated amount of power consumed (e.g., MW values) in descending order: load 1, load 2, load 3, ... load N, with load 1 being the largest MW load and load N being the smallest MW load (block 206).

The control system 80 may determine an allowed overshed MW dead band $db_{MW}$ (block 208). In some embodiments, the deadband may be a dynamic deadband that depends on the required to shed (RTS). For example, a minimum deadband may be used when the RTS is below a predetermined amount. Further a maximum deadband may be used when the RTS is greater than a predetermined amount. Between the minimum deadband and the maximum deadband, the deadband value may be a percentage of the RTS to scale with the RTS. A scaling deadband may be beneficial to account for the scale of shedding that is taking place.

The processor 82 may calculate each node value $N_{values}$ as described with respect to FIG. 2 and table 1 (block 210). That is, the processor 82 may determine the total amount of power shed by each combination of loads.

The processor 82 may then set a pointer to the root node (block 212). Referring to FIG. 2, the pointer may be set to node 1. The processor 82 may check to see if the right subtree has already been analyzed for containing minimum overshed values (block 214). If the right subtree has already been analyzed, the processor 82 may determine whether the pointer is set to the root node (diamond 216). If the pointer is set to the root node, the process may be completed and the minimum overshed value may be provided (oval 220). If the pointer is not set to the root node, the pointer may be set to the parent node of the current node and the process may be repeated (block 218).

If the right subtree has been analyzed, the processor 82 may compare the current node $N_{value}$ to the total power of loads required to be shed $L_{shed}$ (diamond 222). If the current node $N_{value}$ is greater than $L_{shed}$, then the processor 82 may determine whether the overshed, the difference between $N_{value}$ and $L_{shed}$, is less than the deadband $DB_{MW}$ (diamond 224). If the load overshed is below the deadband, the process may be concluded using the found node (oval 220). If the load shedding is greater than the deadband, then the processor 82 may proceed to determine whether a new minimum overshed value has been found (diamond 226). If the amount of load overshed ($N_{value}-L_{shed}$) is less than the current minimum overshed value (diamond 226), then the minimum overshed value may be updated to be the $N_{value}-L_{shed}$ (block 230). Further, the current node and the associated loads may be stored in memory of the control system 80. The processor may then search the right subtree (block 232).

When searching the right subtree (from block 232), if the pointer is pointing to a leaf node (diamond 234), the pointer may be set to point to the parent node of the current node (block 240). If the $N_{value}$ of the left-most leaf node of the right subtree max ($N_{value}$) is greater than $L_{shed}$ (diamond 234), the pointer may be set to the right child node (block 242). Otherwise, the pointer may be set to the parent node (block 240).

If $N_{value}$ is not greater than $L_{shed}$, then the processor 82 may determine whether the left subtree has been searched (diamond 228). If the left subtree has been searched, the processor 82 may continue to search the right subtree (block 232). If the left subtree has not been searched, the processor 82 may search the left subtree to find a set of loads that minimize overshedding (block 236).

When searching the left subtree (from block 236), if the pointer is pointing to a leaf node (diamond 238), the point may return to a parent node (block 240). If the $N_{value}$ of the left-most leaf node on the left subtree is greater than $L_{shed}$, the pointer goes to the left child node (block 244). Otherwise, the pointer may be set to the parent node (block 240).

As an example, if the event given on FIG. 1 were to occur in which 5 MW of generation were shed, the processor 82 may search for the minimum amount of load to shed with a deadband of 0.3 MW. Upon performing the steps 202-212, the right subtree has not been searched (diamond 214). The processor may then compare the $L_{shed}$ of 5 MW to the node 1 value of 5.4 (diamond 222), because 5.4 MW does not fall within the deadband (diamond 224) and the difference causes less overshed than the initial setting (from block 204), the min_overshed value may be updated to be 0.4 MW associated with the load of node 1. Because Node 1 (5.4 MW) is greater than $L_{shed}$ (5 MW) and the difference does not fall within the deadband, the processor 82 may subsequently limit searching to the right subtree (block 232) because the tree has the property that the values in the left subtree of the current node are greater than the node value, thereby eliminating the left subtree (i.e., approximately half of the remaining nodes) from the search.

The processor 82 may compare the right subtree left-most leaf value, 7.8 MW of node 24, to the minimum amount of load to shed, 5.0 MW. (diamond 234). Because node 24 is greater than $L_{shed}$, the processor may update the pointer to be the right child node 3. The process 213 may be repeated for node 3. Because the 3.1 MW of node 3 is less than the minimum amount of load to shed (diamond 222) and the left subtree has not been searched (diamond 228), the processor may search the left subtree (block 236) and set the pointer to be the left child node (block 244).

The process 213 may be repeated at node 6. Because the 5.6 MW of node 6 is greater than the minimum amount of load to shed, the difference between $N_{value}$ and $L_{shed}$, 0.6 MW, may be compared to the minimum overshed value, 0.4 MW set from node 1. Because node 6 does not result in a lower overshed value as compared to node 1, the process may continue by searching the right subtree at node 13 without updating the minimum overshed (skipping block 230). The pointer may then be set to the right node 13 and the process 213 may be repeated. Because 4.5 MW of node 13 is less than $L_{shed}$, the left subtree is searched and the pointer is set to node 26. Because the 5.3 MW of node 26 is greater than the minimum amount of load shed (diamond 222) and the overshed is not greater than the deadband (diamond 224), node 26 of 5.3 MW is selected as the combination of loads that has the minimum amount of power overshed and the process concludes.

Referring to the path taken and table 1, because node 26 was selected, load 2, load 4, and load 5 are selected to be shed. As shown in FIG. 2, because the right path is taken from node 1 (load 1) and node 6 (load 3), the associated loads are not selected to be shed. Because the left path is taken from node 3 (load 2) and node 13 (load 4), the associated loads are selected to be shed. Further, because the leaf node 26 was selected, load 5 is included in the loads to be shed.

The selected node may be associated with a subset of loads to shed from the total set of loads to substantially balance (e.g., within the deadband) the amount of power generated with the amount of power consumed. Further, by selecting the node with the minimum load overshed and the associated subset of loads to shed, more of the loads may be maintained on the power system. Upon selecting the subset of loads to shed, the control system may send signals to one or more electronic devices (e g, IEDs 72-76) to cause the selected subset of loads to be shed. In the example in which node 26 is selected, the processor 82 may send signals to IEDs 73, 75, and 76 to shed load 2, load 4, and load 5. In some embodiments, the control system 80 may send the signals directly to the IEDs, through another electronic device, or over a network.

The IEDs 73, 75, and 76 may receive the control signals indicating shedding of the associated loads and send signals to the circuit breakers 63, 65, and 66 to open the circuit breakers, thereby disconnecting the loads 31, 33, and 34. By disconnecting the loads 31, 33, and 34, more power can be continued to be delivered to other loads while maintaining reliability of the power system.

While the example above uses static load values, in power systems, loads may be added, removed, or updated based on the power measurements obtained from the IEDs 70-76 to maintain the sorted state of the loads, as mentioned in block 206. In some embodiments, the processor may determine the node values in the tree 94 dynamically when the process 200 uses the node. In the example in which 5 MW of generation is lost, upon detection of a contingency in which loads are to be shed, the processor may determine the largest node as being node 1. Further, the processor may calculate node 3 without calculating nodes of the left subtree. By calculating the values of nodes on the tree 94 dynamically, the process may be simplified resulting in fewer calculations.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A control system, comprising:
memory; and
a processor operatively coupled to the memory to execute instructions on the memory to cause the control system to:
obtain an amount of power consumed by each load in a total set of loads in a microgrid;
detect a difference between the amount of power generated and the amount of power consumed;
select a subset of loads to shed from the total set of loads by searching a tree of potential load shedding amounts to achieve minimum amount of load overshed and balance the amount of power generated with the amount of power consumed; and
send one or more signals to one or more electronic devices to cause the selected subset of loads to be shed.

2. The control system of claim 1, wherein substantially balancing the amount of power generated with the amount of power consumed comprises selecting the subset of loads to shed that fall within a deadband.

3. The control system of claim 2, wherein the deadband varies based at least in part on the required load to shed.

4. The control system of claim 1, wherein the processor is configured to, when searching the binary tree of load shedding amounts:
compare a value of a node, having a left and right subtree, to a total load required to be shed;
when the node value is greater than the total load required to be shed and overshed of the node value falls within the dead band, select loads associated with the node value as the subset of loads to shed; and
when the node value is greater than the total load required to be shed and the overshed of the node exceeds the dead band, search only the right subtree.

5. The control system of claim 1, wherein the load shedding amount of a node in the tree is calculated dynamically when the node is used to allow searching of the tree without calculating load shedding amounts at each node.

6. The control system of claim 1, wherein the processor is configured to sort each load in the total set of loads in order by power consumed.

7. The control system of claim 1, wherein the tree of load shedding amounts comprises a plurality of nodes, wherein each node is associated with a potential set of loads to shed to obtain the potential load shedding amount.

8. A non-transitory, computer readable medium, comprising instructions configured to be executed by a processor to cause the processor to:
obtain an amount of power consumed by each load in a total set of loads in a microgrid;
detect a difference between the amount of power generated in the microgrid and the amount of power consumed in the microgrid;
select a subset of loads to shed from the total set of loads by searching a tree of potential load shedding amounts to achieve minimum amount of load overshed and balance the amount of power generated with the amount of power consumed; and
send one or more signals to one or more electronic devices to cause the selected subset of loads to be shed.

9. The non-transitory, computer-readable medium of claim 8, comprising instructions configured to be executed by a processor to cause the processor to:
set a pointer to a current node in the tree; and
compare a left-most node to the difference to determine whether to search the left tree for the subset of loads to shed that results in a minimum load overshed.

10. The non-transitory, computer-readable medium of claim 8, comprising instructions configured to be executed by a processor to cause the processor to:
determine a load overshed as a difference between a value of a current node and an amount of load to be shed;
determine whether the load overshed falls within a deadband; and
when the load overshed falls within the deadband, use loads associated with the current node as the subset of loads to shed, and when the load overshed exceeds the deadband, move the pointer to the right child node of the current node.

11. The non-transitory, computer-readable medium of claim 8, comprising instructions configured to be executed by a processor to cause the processor to:
determine whether a value of a current node exceeds the amount of load to be shed; and
when the value of the current node does not exceed the amount of load to be shed, search the left subtree.

12. The non-transitory, computer-readable medium of claim 8, wherein the tree comprises a binary tree.

13. The non-transitory, computer-readable medium of claim 8, wherein the tree comprises a layer for each load in the total set of loads.

14. The non-transitory, computer-readable medium of claim 8, comprising instructions configured to be executed by a processor to cause the processor to sort each load in the total set of loads in order by amount of power consumed.

15. A method, comprising:
obtaining an amount of power consumed by each load in a total set of loads in a microgrid;
detecting a difference between the amount of power generated and the amount of power consumed
selecting a subset of loads to shed from the total set of loads in the microgrid by searching a tree of potential load shedding amounts for loads that result in a minimum load overshed; and
sending one or more signals to one or more electronic devices to cause the selected subset of loads to be shed.

16. The method of claim 15, wherein the minimum load overshed is the set of loads that balance the power generated on the microgrid with the power consumed.

17. The method of claim 15, comprising generating the tree of potential load shedding amounts based on the power consumed at each load in the microgrid.

18. The method of claim 15, wherein a current node of the tree comprises a left subtree of nodes that represent a load associated with the current node being selected, and wherein the current node of the tree comprises a right subtree of values that represent the load associated with the current node not being selected.

19. The method of claim 18, wherein each node in the first subtree is associated with a load shedding value that is greater than the current node.

20. The method of claim 15, wherein searching the tree of potential load shedding amounts is limited to a predetermined period of time.

\* \* \* \* \*